US012779351B2

(12) United States Patent
Kobashi et al.

(10) Patent No.: US 12,779,351 B2
(45) Date of Patent: Nov. 3, 2026

(54) VIRTUAL EXPERIENCE PROVIDING SYSTEM, VIRTUAL EXPERIENCE PROVIDING METHOD, AND STORAGE MEDIUM

(71) Applicant: HONDA MOTOR CO., LTD., Tokyo (JP)

(72) Inventors: Shinichiro Kobashi, Wako (JP); Tomokazu Sakamoto, Wako (JP); Hiroshi Iwakami, Wako (JP); Shota Yamaguchi, Wako (JP); Naoto Shikano, Wako (JP); Satoshi Haneda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 833 days.

(21) Appl. No.: 17/854,017

(22) Filed: Jun. 30, 2022

(65) Prior Publication Data

US 2023/0001314 A1 Jan. 5, 2023

(30) Foreign Application Priority Data

Jul. 1, 2021 (JP) ................................ 2021-109860

(51) Int. Cl.

*A63G 31/16* (2006.01)
*A63G 31/02* (2006.01)
(Continued)

(52) U.S. Cl.

CPC ............. *A63G 31/16* (2013.01); *A63G 31/02* (2013.01); *B62J 45/20* (2020.02); *B62K 11/007* (2016.11); *G06F 3/011* (2013.01); *G06F 3/016* (2013.01)

(58) Field of Classification Search

CPC ....... A63G 31/16; B62J 45/20; B62K 11/007; G06F 3/011; A63F 13/217; A63F 13/42; G06T 19/006

See application file for complete search history.

(56) References Cited

U.S. PATENT DOCUMENTS

2001/0040586 A1 11/2001 Yokoyama et al.
2012/0175175 A1 7/2012 Gomi et al.
(Continued)

FOREIGN PATENT DOCUMENTS

CN 106029190 10/2016
CN 208481999 2/2019
(Continued)

OTHER PUBLICATIONS

Japanese Office Action for Japanese Patent Application No. 2021-109860 mailed Apr. 4, 2023.
Chinese Office Action for Chinese Patent Application No. 202210694305.1 mailed Jan. 12, 2026.

*Primary Examiner* — Michael D Dennis
(74) *Attorney, Agent, or Firm* — Amin, Turocy & Watson, LLP

(57) ABSTRACT

A virtual experience providing system that provides a virtual experience in a virtual reality image based on a virtual world representing a real world or an artificial world to a user who rides a rideable mobile body includes a storage medium configured to store computer-readable instructions and a processor connected to the storage medium, the processor executing the computer-readable instructions to generate a basic movement command which is a movement command to the rideable mobile body based on a steering operation of the user and generate an event action command different from the basic movement command when a predetermined event has occurred in the virtual world, wherein the event action command is a command for causing the rideable (Continued)

mobile body to perform an event action that is predetermined according to the predetermined event.

6 Claims, 7 Drawing Sheets

(51) Int. Cl.
*B62J 45/20* (2020.01)
*B62K 11/00* (2006.01)
*G06F 3/01* (2006.01)

(56) References Cited

U.S. PATENT DOCUMENTS

| | | | | |
|---|---|---|---|---|
| 2016/0346704 | A1 | 12/2016 | Wagner | |
| 2018/0148115 | A1* | 5/2018 | Hirabayashi | B62K 1/00 |
| 2018/0253905 | A1* | 9/2018 | McCracken | A63G 31/16 |
| 2018/0329480 | A1* | 11/2018 | Schwartz | A63F 13/00 |
| 2018/0369702 | A1* | 12/2018 | Hake | A63G 25/00 |
| 2019/0302776 | A1* | 10/2019 | Ilardi | B62D 15/00 |
| 2019/0351340 | A1* | 11/2019 | Goergen | A63G 31/00 |
| 2020/0098190 | A1* | 3/2020 | Goergen | A63G 7/00 |

FOREIGN PATENT DOCUMENTS

| | | | |
|---|---|---|---|
| CN | 110352087 | 10/2019 | |
| JP | 09-311948 | 12/1997 | |
| JP | 2000-149059 | 5/2000 | |
| JP | 2017-522911 | 8/2017 | |
| JP | 2020-511218 | 4/2020 | |
| JP | 2020-103782 | 7/2020 | |
| JP | 2020-519366 | 7/2020 | |
| JP | 2022-083247 | 6/2022 | |
| KR | 2015-0135154 | 12/2015 | |
| WO | 2011/033585 | 3/2011 | |
| WO | 2019/221798 | 11/2019 | |
| WO | WO-2020027531 A1 * | 2/2020 | G09B 9/04 |

* cited by examiner

VIRTUAL EXPERIENCE PROVIDING SYSTEM, VIRTUAL EXPERIENCE PROVIDING METHOD, AND STORAGE MEDIUM

CROSS-REFERENCE TO RELATED APPLICATION

Priority is claimed on Japanese Patent Application No. 2021-109860, filed Jul. 1, 2021, the content of which is incorporated herein by reference.

BACKGROUND

Field of the Invention

The present invention relates to a virtual experience providing system, a virtual experience providing method, and a storage medium.

Description of Related Art

A technique for displaying content corresponding to a predetermined route of a mobile body in VR goggles when providing an amusement experience using the VR goggles is known in the related art (Published Japanese Translation No. 2017-522911 of the PCT International Publication).

SUMMARY

When a user has an experience including movement in the content of VR goggles, it may not be possible to realize the movement of a mobile body or perform an action associated with the content according to the user's intention, resulting in a lack of a sense of presence.

Aspects of the present invention have been made in consideration of such circumstances and it is an object of the present invention to provide a virtual experience providing system, a virtual experience providing method, and a storage medium that can produce a sense of presence when providing a virtual experience to a user.

The virtual experience providing system, the virtual experience providing method, and the storage medium according to the present invention have the following configurations.

(1) A virtual experience providing system according to an aspect of the present invention is a virtual experience providing system that provides a virtual experience in a virtual reality image based on a virtual world representing a real world or an artificial world to a user who rides a rideable mobile body, the system including a storage medium configured to store computer-readable instructions and a processor connected to the storage medium, the processor executing the computer-readable instructions to generate a basic movement command which is a movement command to the rideable mobile body based on a steering operation of the user and generate an event action command different from the basic movement command when a predetermined event has occurred in the virtual world, wherein the event action command is a command for causing the rideable mobile body to perform an event action that is predetermined according to the predetermined event.

(2) In the above aspect (1), the steering operation is performed according to movement of a center of gravity of the user and the processor generates the basic movement command based on the movement of the center of gravity detected using a sensor mounted on the rideable mobile body and generates a correction command for changing a relationship between the steering operation and the basic movement command as the event action command based on an environment in which the rideable mobile body is placed in the virtual world.

(3) In the above aspect (1), the rideable mobile body has a function of moving the user up and down and the processor generates a command for an operation of moving the user up and down as the event action command.

(4) In the above aspect (1), the rideable mobile body has a function of moving the user up and down and the processor generates a command for an operation of moving the user up and down as the basic movement command based on the steering operation of the user.

(5) In the above aspect (1), the rideable mobile body includes a blower and the processor generates a command for an operation of activating the blower in response to a change in an environment in the virtual world as the event action command when a specific predetermined event has occurred.

(6) In the above aspect (1), the processor generates a command for an operation of moving the rideable mobile body backward as the event action command when the predetermined event in which the user who rides the rideable mobile body collides with an object has occurred.

(7) In the above aspect (1), the processor further operates the rideable mobile body based on both the basic movement command and the event action command.

(8) In the above aspect (7), when causing the rideable mobile body to perform an operation based on both the basic movement command and the event action command, the processor generates an event action command for not performing an operation hindering an operation based on the basic movement command.

(9) A virtual experience providing method according to another aspect of the present invention is a virtual experience providing method performed using at least one computer of a virtual experience providing system that provides a virtual experience in a virtual reality image based on a virtual world representing a real world or an artificial world to a user who rides a rideable mobile body, the method including generating a basic movement command which is a movement command to the rideable mobile body based on a steering operation of the user and generating an event action command different from the basic movement command when a predetermined event has occurred in the virtual world, wherein the event action command is a command for causing the rideable mobile body to perform an event action that is predetermined according to the predetermined event.

(10) A storage medium according to another aspect of the present invention is a computer-readable non-transitory storage medium storing a program causing at least one computer of a virtual experience providing system, the system providing a virtual experience in a virtual reality image based on a virtual world representing a real world or an artificial world to a user who rides a rideable mobile body, to generate a basic movement command which is a movement command to the rideable mobile body based on a steering operation of the user and generate, when a predetermined event has occurred in the virtual world, an event action command for causing the rideable mobile body to perform an event action that is predetermined according to the predetermined event, the event action command being a command different from the basic movement command.

According to the above aspects (1) to (10), it is possible to produce a sense of presence when providing a virtual experience to a user.

DESCRIPTION OF EMBODIMENTS

Hereinafter, embodiments of a virtual experience providing system, a virtual experience providing method, and a storage medium of the present invention will be described with reference to the drawings. The virtual experience providing system is, for example, a system that provides a virtual experience using a rideable mobile body which a user rides. The virtual experience providing system provides the user with a service for providing a virtual experience of a virtual world representing the real world or an artificial world. The virtual experience providing system can provide a virtual experience such as an unrealistic game world. This service is provided, for example, in a virtual experience facility. The virtual experience is, for example, an experience in which a user becomes a player in a game and participates in the game. The virtual experience facility is, for example, a facility having a traveling space in which the rideable mobile body travels. Hereinafter, a virtual experience may sometimes be referred to as content.

First Embodiment

Figure 1:
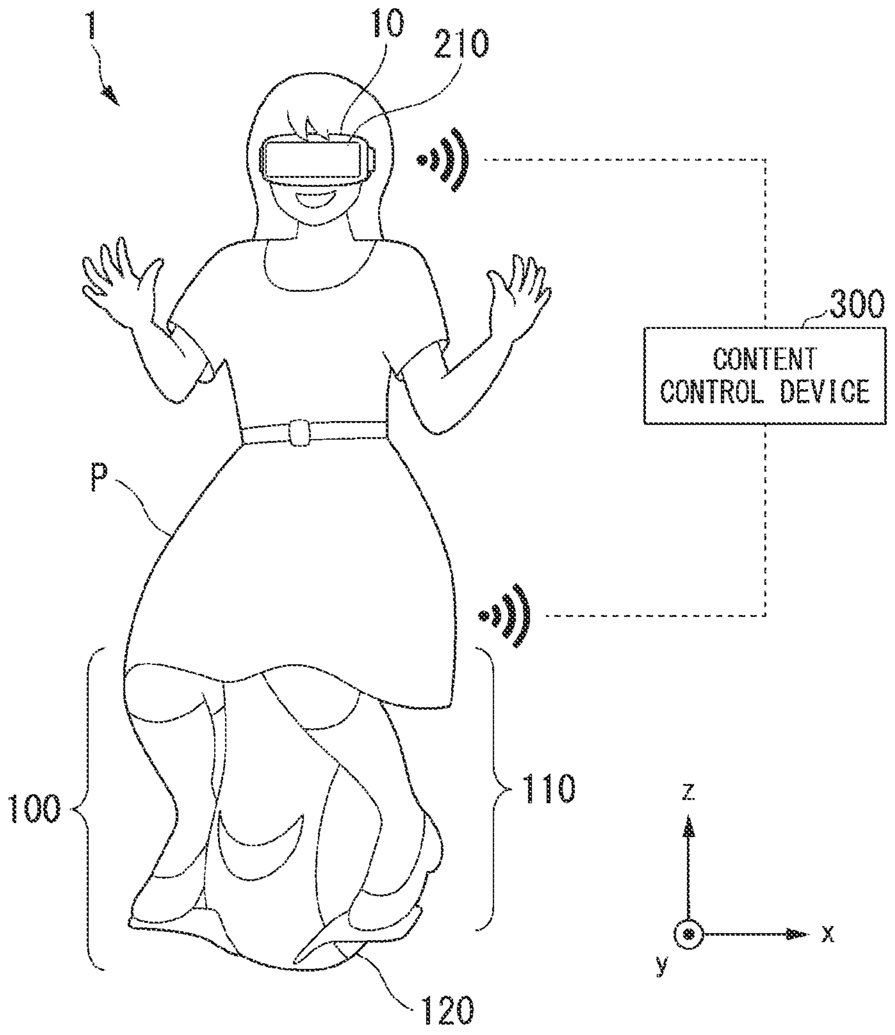
FIG. 1 is a configuration diagram of a virtual experience providing system of a first embodiment.

FIG. 1 is a configuration diagram of a virtual experience providing system 1 of a first embodiment. The virtual experience providing system 1 includes, for example, a rideable mobile body 100, a head-mounted display 200, and a content control device 300. Of the rideable mobile body 100, the head-mounted display 200, and the content control device 300, at least both the rideable mobile body 100 and the content control device 300 and both the head-mounted display 200 and the content control device 300 can communicate each other in a wireless manner or the like. The rideable mobile body 100 includes a base 110 and an omnidirectional moving wheel 120.

In the first embodiment, the rideable mobile body 100 is controlled such that it automatically travels, for example, as content provided by the head-mounted display 200 progresses. The rideable mobile body 100 also moves by balance control for a steering operation corresponding to movement of the center of gravity of the user P. That is, the rideable mobile body 100 moves according to both the progress of the content and the movement of the center of gravity of the user P. The content is preferably content having degrees of freedom to the extent that movements according to the intention of the user P are allowed. For example, in a scene in which the user P is to move forward in the flow of content, it is preferable that the content have degrees of freedom such that the rideable mobile body 100 decelerates or stops when the user P has performed a steering operation indicating the intention to "move backward" and the rideable mobile body 100 turns into a side road when the user P has performed a steering operation indicating the intention to "turn left or right."

The head-mounted display 200 is, for example, virtual reality (VR) goggles. The head-mounted display 200 receives data for displaying a virtual reality image (hereinafter referred to as content playback data) from the content control device 300 and displays the virtual reality image on its own display 210. The head-mounted display 200 may be mixed reality (MR) goggles or augmented reality (AR) goggles. The method of realizing the head-mounted display 200 is not limited to a specific method as long as it allows the user P to perceive the same sense. For example, the projection method of the head-mounted display 200 may be a retinal projection method, a virtual image projection method, or another method. Further, for example, a display unit of the head-mounted display 200 may be of an open type or a shield type.

The content control device 300 generates content data and transmits it to the head-mounted display 200. The content control device 300 instructs the rideable mobile body 100 to operate in synchronization with the virtual reality image displayed on the head-mounted display 200. By doing so, the rideable mobile body 100 can operate in conjunction with the virtual reality image displayed on the head-mounted display 200 and the user P can have a virtual experience as a player in the virtual reality image. The content control device 300 may be installed in a virtual experience facility or may be a cloud server that communicates via a network such as the Internet.

Rideable Mobile Body

Figure 2:
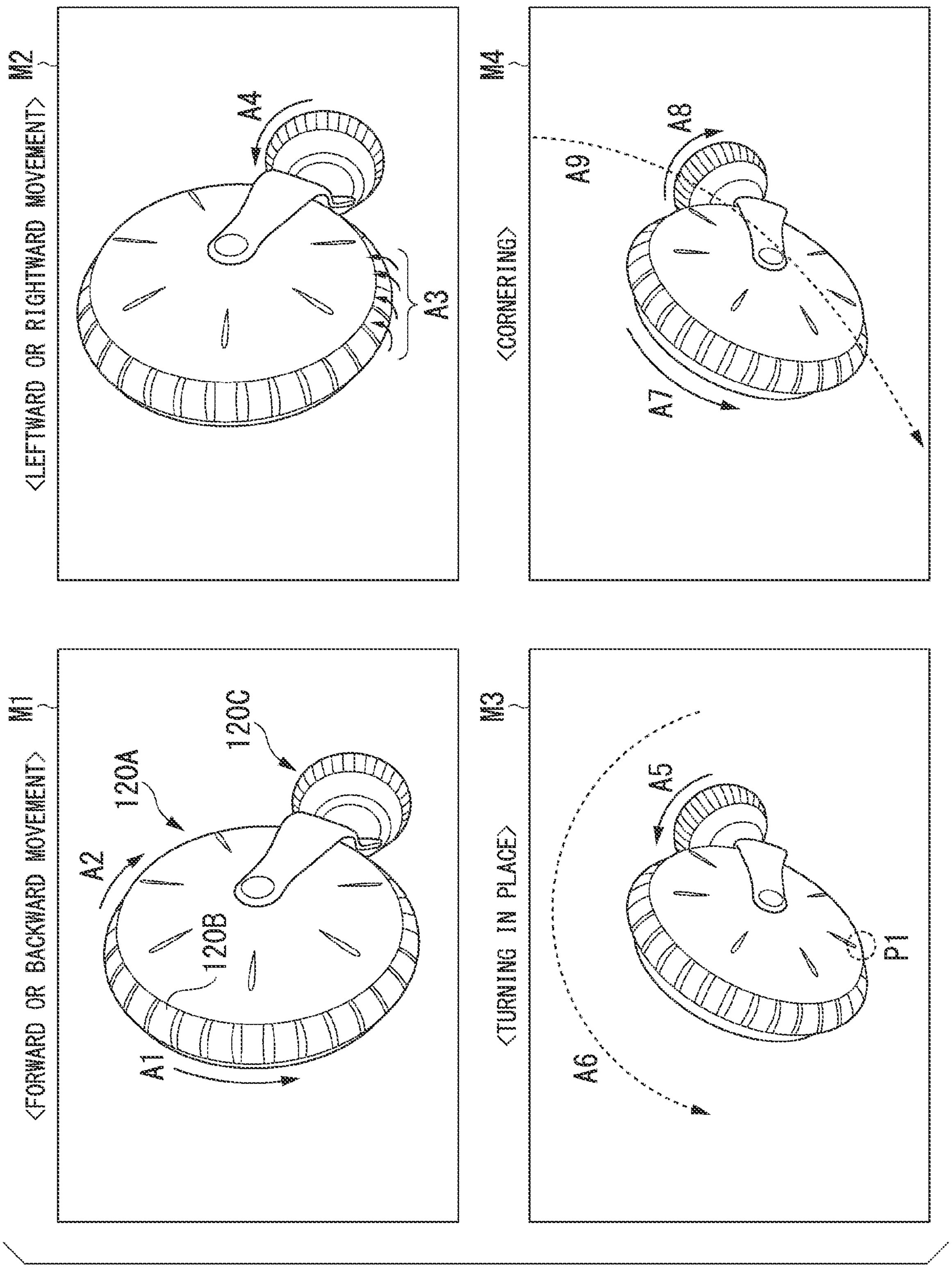
FIG. 2 is a diagram for explaining the configuration and operation of an omnidirectional moving wheel of a rideable mobile body.

FIG. 2 is a diagram for explaining the configuration and operation of the omnidirectional moving wheel 120 of the rideable mobile body 100. The omnidirectional moving wheel 120 is a wheel that enables the vehicle to immediately advance in an arbitrary direction (in all directions of 360 degrees) from the current position without performing a preliminary operation such as turning. The omnidirectional moving wheel 120 includes, for example, a large-diameter wheel 120A as a front wheel and a turning wheel 120C as a rear wheel and has a plurality of small diameter wheels 120B on a ground contact portion (a radially outer edge portion) of the large-diameter wheel 120A which is the front wheel. The large-diameter wheel 120A is a wheel that mainly realizes straight-ahead movement in the forward/backward direction. The small-diameter wheels 120B are wheels that mainly realize lateral movement on the spot by rotating around the rotation direction (circumferential direction) of the large-diameter wheel 120A as a rotation axis. On the other hand, the turning wheel 120C which is the rear wheel has a smaller diameter than the large-diameter wheel 120A and mainly realizes turning movement by rotating around a rotation axis orthogonal to the rotation axis of the large-diameter wheel 120A. The omnidirectional moving wheel 120 includes motors (not shown) that can independently control the rotations of the large diameter wheel 120A, the small diameter wheels 120B, and the turning wheel 120C. With such a configuration, the omnidirectional moving wheel 120 can realize not only movements in various directions such as just sideways and oblique but also agile movements such as turning in place and curving by using the difference in lateral movement speed between the front and rear wheels in addition to the forward/backward movement.

Here, the forward direction of the rideable mobile body 100 is the positive direction of the y-axis in FIG. 1 (the direction from the back to the front of the paper, which is hereinafter referred to as a +y-axis direction) and the backward direction is the negative direction of the y-axis (the direction from the front to the back of the paper, which is hereinafter referred to as a −y-axis direction). For example, as shown in an operation example M1 (forward or backward movement) of FIG. 2, the omnidirectional moving wheel 120 moves forward by rotating the large-diameter wheel 120A in the direction of an arrow A1 and moves backward by rotating the large-diameter wheel 120A in the direction of an arrow A2.

Further, as shown in an operation example M2 (leftward or rightward movement) of FIG. 2, the omnidirectional moving wheel 120 can move to the left on the spot without changing the direction by rotating the small diameter wheels 120B in the direction of an arrow A3. In this case, the turning wheel 120C may be configured to rotate naturally in the direction of an arrow A4 according to the movement in the leftward/rightward direction or may be controlled to rotate in the direction of the arrow A4 according to the amount of rotation of the small diameter wheels 120B. The omnidirectional moving wheel 120 can also move to the right on the spot without changing the direction by rotating the small diameter wheels 120B in a direction opposite to the direction of the arrow A3. The leftward direction referred to here is the leftward direction in FIG. 1 and corresponds to the negative direction of the x-axis (a −x-axis direction) and the rightward direction is the rightward direction in FIG. 1 and corresponds to the positive direction of the x-axis (a +x-axis direction). The plurality of small diameter wheels 120B may be configured such that all the wheels rotate at the same time or may be configured such that only wheels at the ground contact portion rotate.

As shown in an operation example M3 (turning in place) of FIG. 2, the omnidirectional moving wheel 120 can turn in place in the direction of an arrow A6 around a ground contact point P1 of the large-diameter wheel 120A as a center by rotating the turning wheel 120C in the direction of an arrow A5 and can turn in place in a direction opposite to the arrow A6 by rotating in a direction opposite to the arrow A5.

As shown in an operation example M4 (cornering) of FIG. 2, the omnidirectional moving wheel 120 can move forward while turning in the direction of an arrow A9 (can corner) by rotating the large-diameter wheel 120A in the direction of an arrow A7 and the turning wheel 120C in the direction of an arrow A8. The omnidirectional moving wheel 120 can also move backward while turning in a direction opposite to the direction of the arrow A9 by rotating the large-diameter wheel 120A in a direction opposite to the direction of the arrow A7 and the turning wheel 120C in the direction of the arrow A8. In this example, the omnidirectional moving wheel 120 can also move forward or backward while keeping the turning center on the right side by rotating the turning wheel 120C in a direction opposite to the arrow A8.

The method of realizing the omnidirectional moving wheel 120 is not limited to the method of FIG. 2. The omnidirectional moving wheel 120 may be realized by any existing technique. Also, the rideable mobile body 100 may include one omnidirectional moving wheel 120 or may include a plurality of omnidirectional moving wheels 120. Further, the rideable mobile body 100 may include an ordinary wheel(s) as an auxiliary wheel(s) in addition to the omnidirectional moving wheel 120. The operation of the omnidirectional moving wheel 120 is controlled by a control unit (not shown) mounted in the rideable mobile body 100 (for example, installed in a seat 180) and the control unit changes the operation (the moving direction and speed) of the omnidirectional moving wheel 120 based on a control signal input from the content control device 300.

Figure 3:
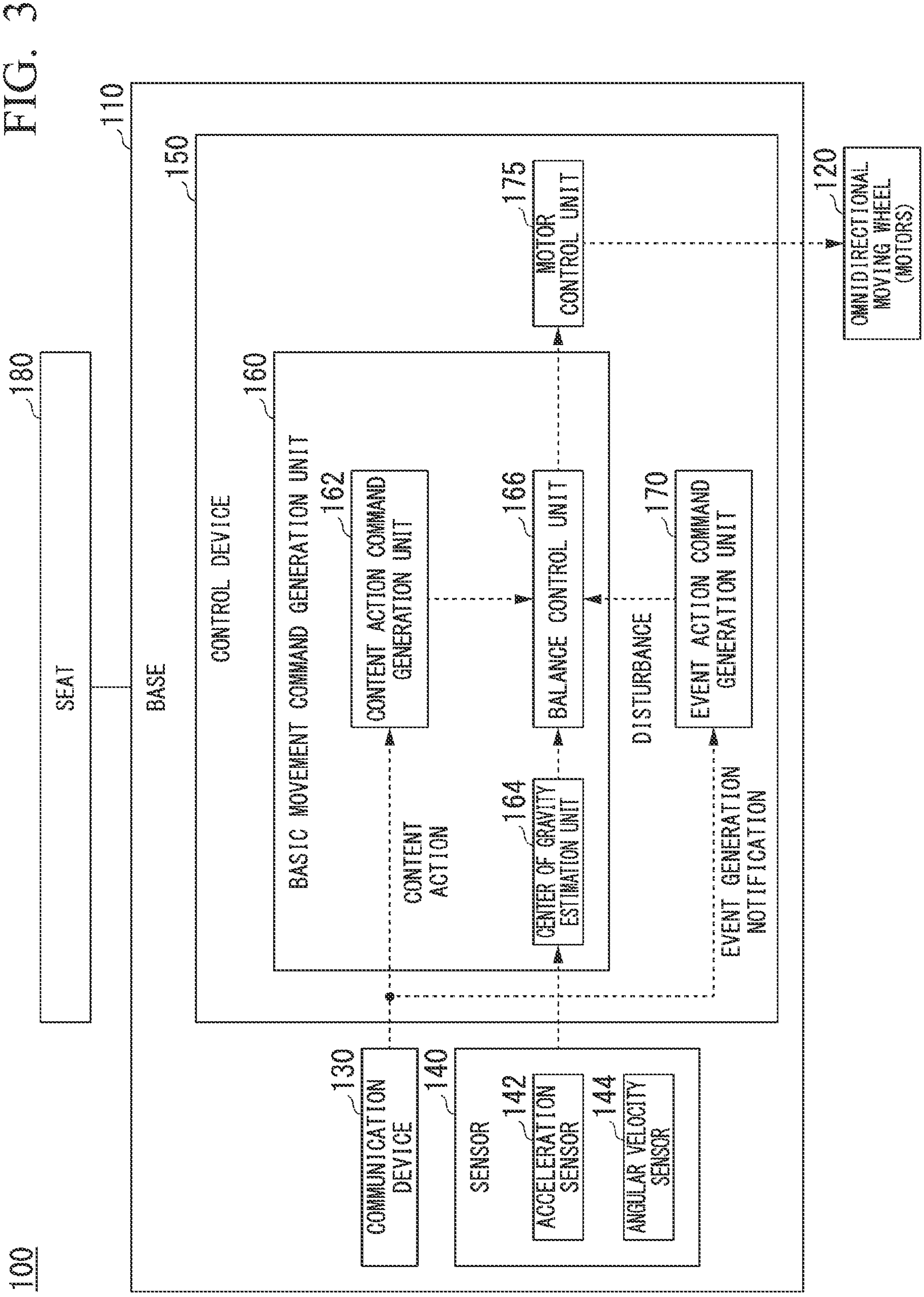
FIG. 3 is a block diagram of the rideable mobile body.

FIG. 3 is a configuration diagram of the rideable mobile body 100. The rideable mobile body 100 includes, for example, a communication device 130, a sensor 140, and a control device 150 in the base 110. The base 110 is provided with the seat 180. The communication device 130 communicates with the content control device 300. The communication device 130 performs wireless communication, for example, based on Wi-Fi, DSRC, Bluetooth (registered trademark), and other communication standards. The communication device 130 periodically transmits the amount of movement and position of the rideable mobile body 100 to the content control device 300 under the control of the control device 150.

The sensor 140 includes, for example, an acceleration sensor 142 and an angular velocity sensor 144. The acceleration sensor 142 is attached to one or more arbitrary positions of the base 110 or the seat 180, detects an acceleration acting at each attachment position, and outputs the acceleration to the control device 150. Similarly, the angular velocity sensor 144 is attached to one or more arbitrary positions of the base 110 or the seat 180, detects an angular velocity acting at each attachment position, and outputs the angular velocity to the control device 150.

The control device 150 includes, for example, a basic movement command generation unit 160, an event action command generation unit 170, and a motor control unit 175. The basic movement command generation unit 160 includes, for example, a content action command generation unit 162, a center of gravity estimation unit 164, and a balance control unit 166. These components are implemented, for example, by a hardware processor such as a central processing unit (CPU) executing a program (software). Some or all of these components may be implemented by hardware (including circuitry) such as large scale integration (LSI), an application specific integrated circuit (ASIC), a field-programmable gate array (FPGA), or a graphics processing unit (GPU) or may be implemented by software and hardware in cooperation. The program may be stored in a storage device (a storage device including a non-transitory storage medium) such as a hard disk drive (HDD) or a flash memory in advance or may be stored in a detachable storage medium (a non-transitory storage medium) such as a DVD or a CD-ROM and then installed in the storage device by mounting the storage medium in a drive device.

The functions of each unit of the control device 150 will be described after the functions of the content control device 300 are described.

Figure 4:
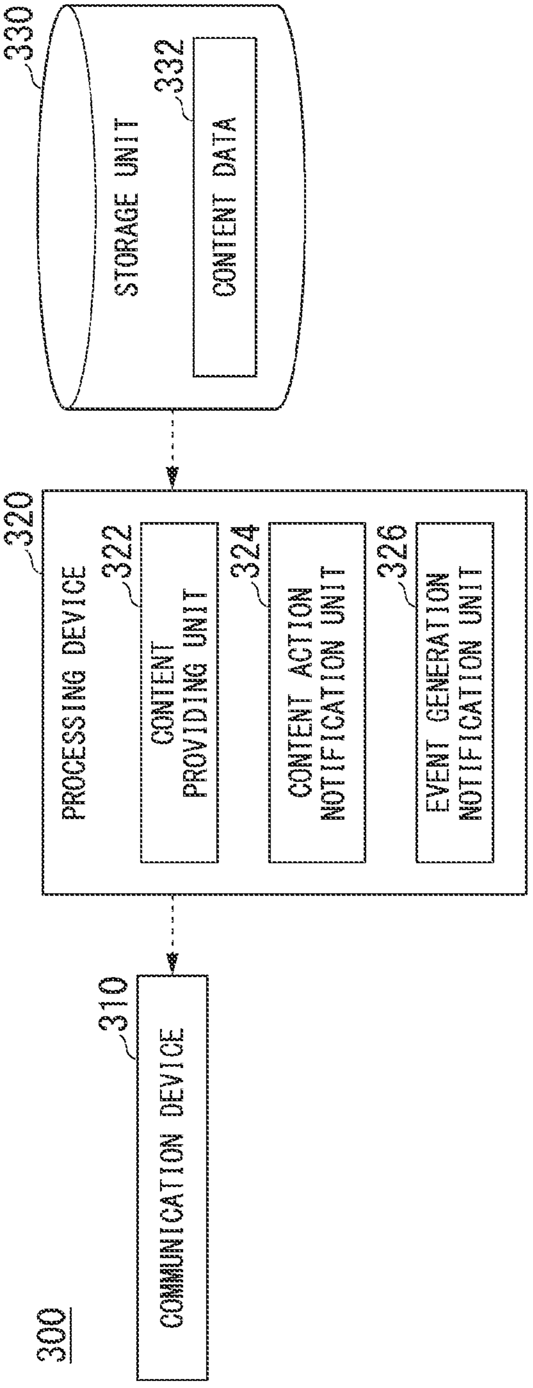
FIG. 4 is a configuration diagram of a content control device.

FIG. 4 is a configuration diagram of the content control device 300. The content control device 300 includes, for example, a communication device 310, a processing device 320, and a storage unit 330.

The communication device 310 communicates with the rideable mobile body 100 and the head-mounted display 200. A communication device may be integrated in either the rideable mobile body 100 or the head-mounted display 200, and for example, the rideable mobile body 100 may appropriately transfer information received from the content control device 300 to the head-mounted display 200 by wire or wirelessly.

The processing device 320 includes, for example, a content providing unit 322, a content action notification unit 324, and an event occurrence notification unit 326. These components are implemented, for example, by a hardware processor such as a CPU executing a program (software).

Some or all of these components may be implemented by hardware (including circuitry) such as LSI, an ASIC, an FPGA, or a GPU or may be implemented by software and hardware in cooperation. The program may be stored in a storage device (a storage device including a non-transitory storage medium) such as an HDD or a flash memory in advance or may be stored in a detachable storage medium (a non-transitory storage medium) such as a DVD or a CD-ROM and then installed in the storage device by mounting the storage medium in a drive device.

The storage unit 330 is, for example, an HDD or a flash memory. Content data 332 is stored in the storage unit 330. The content data 332 includes map information of a virtual world (including the positions of objects that are virtually present), basic movement information that determines the direction and speed at which the user P and the rideable mobile body 100 are to move in the virtual world with the passage of time, information on events that occur with the passage of time, information on events that occur according to the position where the user P and the rideable mobile body 100 are present in the virtual world (calculated by acquiring information from the rideable mobile body 100 as described above), progress schedule information of the content according to points earned according to the user P's actions in the virtual world, and the like.

Using the communication device 310, the content providing unit 322 transmits content playback data to the head-mounted display 200 based on the content data 332. The content playback data may include audio data.

The content action notification unit 324 transmits a content action synchronized with the content playback data to the rideable mobile body 100 using the communication device 310. Content actions are, for example, instruction information such as that of instructions to move forward, move backward, stop, turn right, turn left, move to the right, and move to the left with a speed attached to each of them.

The event occurrence notification unit 326 transmits an event occurrence notification to the rideable mobile body 100 using the communication device 310 at the timing when a predetermined event is to occur according to event information in the content data. Predetermined events are events with conditions of occurrence determined in advance such that they are to occur based on an environment in which the rideable mobile body is placed in the virtual world (which typically means the position, the elapsed time, or a combination thereof). The event occurrence notification is instruction information instructing the rideable mobile body 100 to generate a predetermined event and includes information instructing an operation of the rideable mobile body 100 such as swinging back and forth, swinging from side to side, movement (acceleration or deceleration) in a specific direction, or temporary stop.

Hereinafter, the functions of each unit of the control device 150 of the rideable mobile body 100 will be described again. The content action command generation unit 162 of the basic movement command generation unit 160 generates a content action command based on a content action that the communication device 130 has received from the content control device 300. The content action command appropriately controls the motors attached to the omnidirectional moving wheel 120 according to instruction information such as that of an instruction to move forward, move backward, stop, turn right, turn left, move to the right, or move to the left included in the content action. Specifically, the content action command contains information such as "move in direction XX at speed AA" or "turn clockwise at speed XX." The content action command may also be represented in another measure such as acceleration. The content action command generation unit 162 outputs the content action command to the balance control unit 166.

The center of gravity estimation unit 164 estimates the center of gravity of an object including the user P, the base 110, and the seat 180 based on the outputs of the acceleration sensor 142 and the angular velocity sensor 144.

The balance control unit 166 generates a control command with a direction for returning the position of the center of gravity estimated by the center of gravity estimation unit 164 to a reference position (a position of the center of gravity in a stationary state). For example, when the position of the center of gravity is biased to the right rear of the reference position, the balance control unit 166 generates information indicating acceleration toward the right rear as a control command. Further, the balance control unit 166 adjusts the control command such that the rideable mobile body 100 does not fall while realizing the behavior of the rideable mobile body 100 based on each of the content action command and the event action command. For example, when the content action command is for an accelerated forward movement and the position of the center of gravity is behind the reference position, the balance control unit 166 may suppress the acceleration to prevent the position of the center of gravity from being further biased backward by the accelerated forward movement or may start the accelerated forward movement after temporally moving the rideable mobile body 100 backward to adjust the position of the center of gravity forward. In the first embodiment, a part (component), which is based on both the center of gravity estimated by the center of gravity estimation unit 164 and the content action command, of the control command generated by the balance control unit 166 corresponds to a basic movement command.

Then, the basic movement command generation unit 160 outputs the control command generated by the balance control unit 166 to the motor control unit 175. The motor control unit 175 individually controls each motor attached to the omnidirectional moving wheel 120 based on the control command input from the basic movement command generation unit 160.

With such control, the user P can move the rideable mobile body 100 in a desired direction by changing his/her posture to move the center of gravity in a desired direction. That is, the rideable mobile body 100 recognizes the movement of the center of gravity of the user P as a steering operation for the rideable mobile body 100 and performs a moving operation according to the steering operation.

The event action command generation unit 170 generates an event action command based on the event occurrence notification that the communication device 130 has received from the content control device 300. The event action command of the first embodiment is information on a disturbance given to processing performed by the balance control unit 166. For example, when the event occurrence notification indicates "to swing back and forth," the event action command generation unit 170 corrects the position of the center of gravity estimated by the center of gravity estimation unit 164 such that the position of the center of gravity repeatedly changes back and forth at a predetermined cycle. Thereby, the basic movement command is corrected such that it includes an operation of swinging back and forth. Further, when the event occurrence notification is "to suppress a forward movement due to a steering operation," the event action command generation unit 170 outputs an upper limit value of the forward speed to the balance control unit 166. In this way, the event action command generation unit 170 generates a correction command for changing the relationship between the steering operation (movement of the center of gravity) and the basic movement command based on the environment (described above) in which the rideable mobile body 100 is placed in the virtual world as an event action command.

Figure 5:
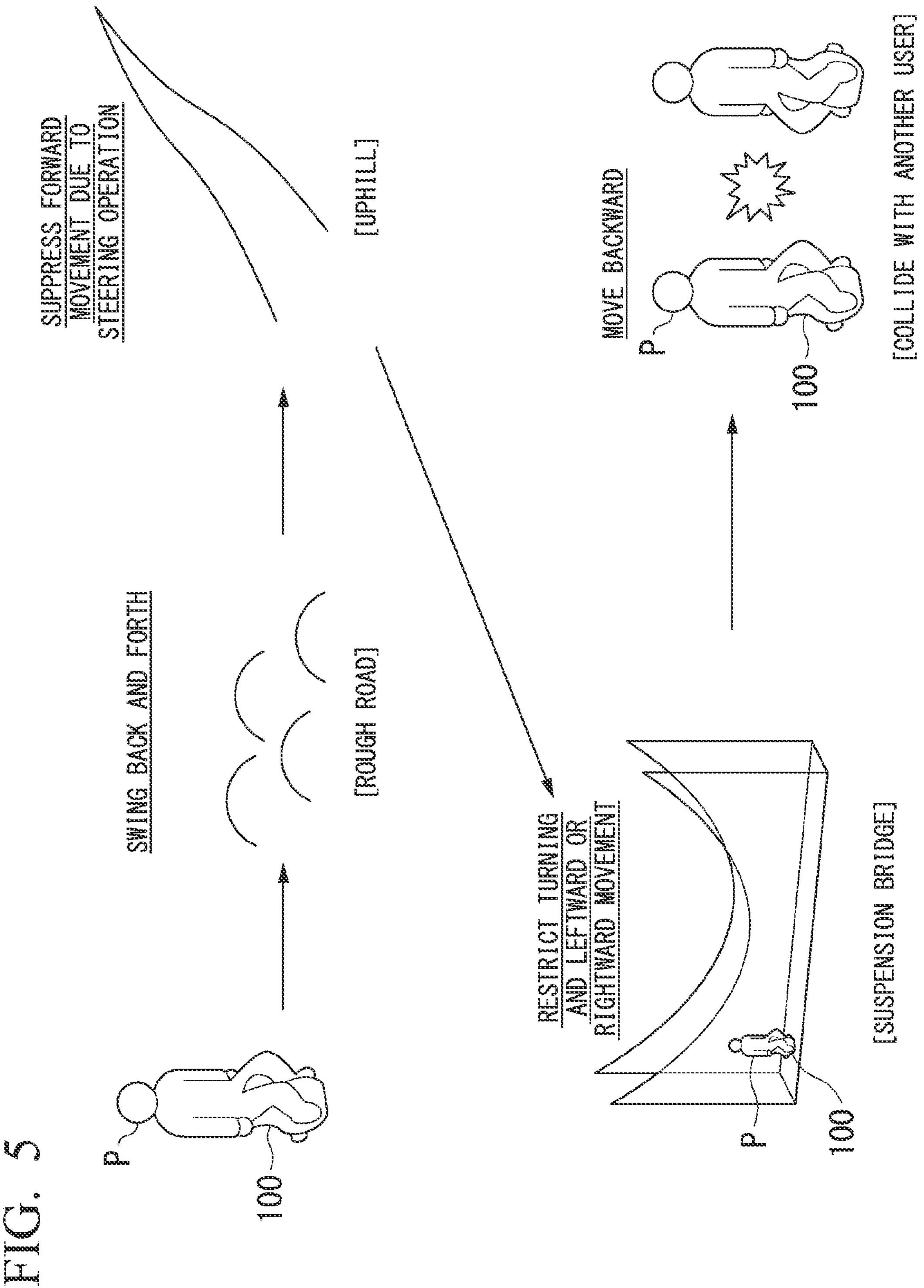
FIG. 5 is a diagram schematically showing examples of predetermined events in a virtual world.

An example of the relationship between examples of predetermined events in a virtual world and event action commands will be described below. FIG. 5 is a diagram schematically showing examples of predetermined events in a virtual world. For example, a rough road, an uphill, a suspension bridge, and a collision with another user P in the same virtual world are prepared as predetermined events.

When the user P and the rideable mobile body 100 pass through a rough road in the virtual world, for example, an event occurrence notification indicating "to swing back and forth" is given. In response to this, the event action command generation unit 170 performs the processing described above. This can provide the user P with an experience as if he/she is actually driving on a rough road. When an event occurrence notification indicating "to swing from side to side" is given, the event action command generation unit 170 corrects the position of the center of gravity estimated by the center of gravity estimation unit 164 such that it repeatedly changes from side to side at a predetermined cycle.

When the user P and the rideable mobile body 100 pass through an uphill in the virtual world, an event occurrence notification indicating, for example, "to suppress a forward movement due to a steering operation" is given. In response to this, for example, the event action command generation unit 170 suppresses the forward speed below usual when the position of the center of gravity estimated by the center of gravity estimation unit 164 is ahead of the reference position. For example, the event action command generation unit 170 sets the upper limit value of the forward speed lower as the slope of the uphill included in the event occurrence notification is larger and transmits the upper limit value to the balance control unit 166. This can provide the user P with an experience in which the rideable mobile body 100 does not easily move forward on an uphill.

When the user P and the rideable mobile body 100 pass through a suspension bridge in the virtual world, for example, an event occurrence notification indicating "to restrict turning and leftward or rightward movement" is given. In response to this, the event action command generation unit 170 corrects the position of the center of gravity estimated by the center of gravity estimation unit 164 to the reference position in the leftward/rightward direction even if the position of the center of gravity is biased to either the left or right from the reference position. This can provide the user P with an experience in which the rideable mobile body 100 cannot move to the left or right on a suspension bridge.

When the user P and the rideable mobile body 100 collide with another user P in the virtual world, for example, an event occurrence notification indicating "to move backward" is given. In response to this, the event action command generation unit 170 forcibly corrects the position of the center of gravity estimated by the center of gravity estimation unit 164 sufficiently behind the reference position. This can provide the user P with an experience in which the rideable mobile body 100 temporarily moves backward due to a collision.

With such control, the virtual experience providing system 1 can enhance the sense of presence when providing a virtual world experience.

Figure 6:
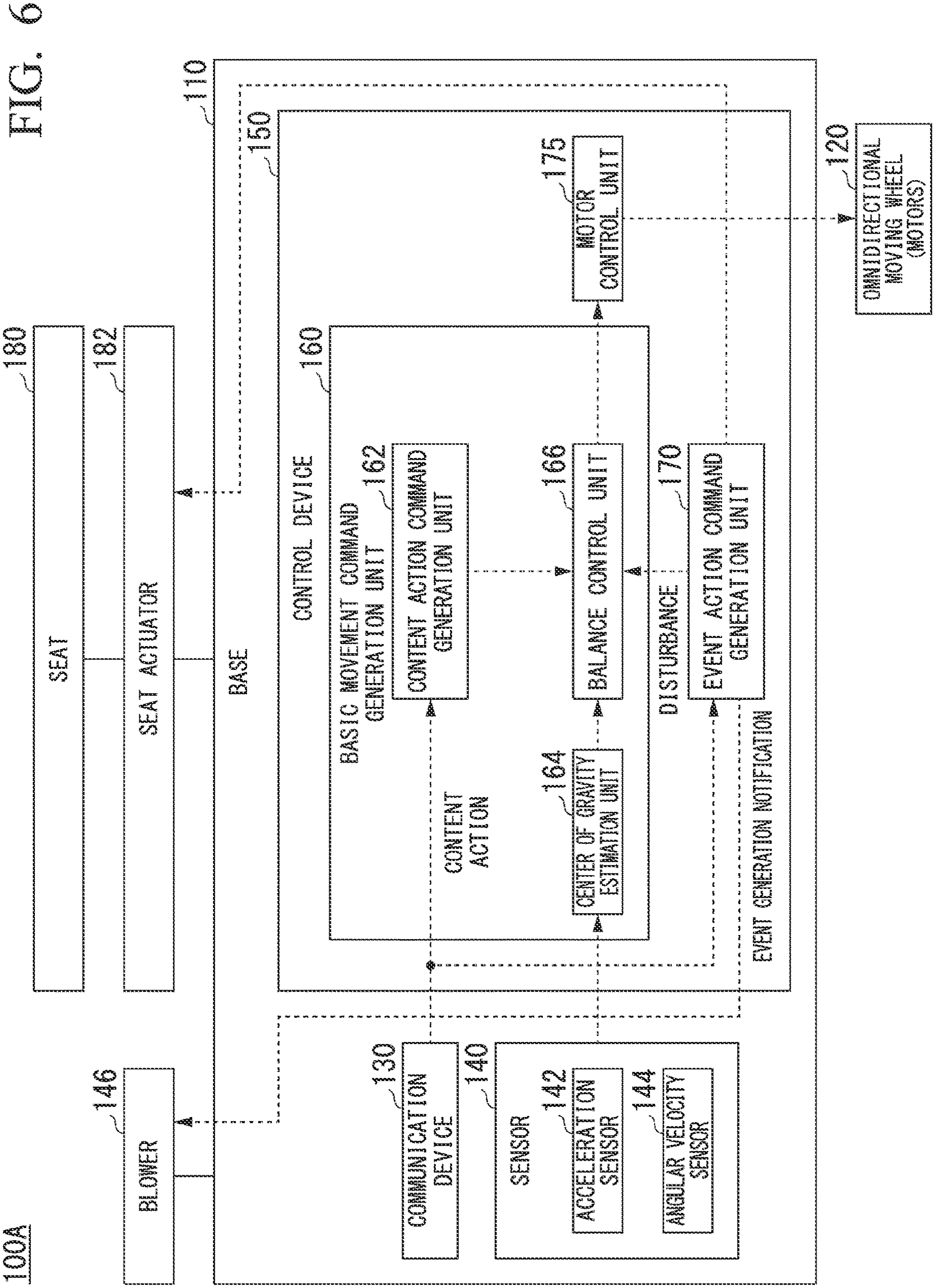
FIG. 6 is a configuration diagram of a rideable mobile body according to a modification of the first embodiment.

FIG. 6 is a configuration diagram of a rideable mobile body 100A according to a modification of the first embodiment. In the first embodiment, the rideable mobile body 100A may include a seat actuator 182 that moves the seat 180 up and down with respect to the base 110 or tilts the seat 180 forward, backward, to the left, or to the right with respect to the base 110. The rideable mobile body 100A may also include a blower 146 that blows air to the head of the user P or the like. In this case, the control device 150 may perform control for swinging the seat 180 up and down or swinging (fluctuating) the forward, backward, leftward, and rightward tilt of the seat 180, for example, when the user P and the rideable mobile body 100A pass through a rough road in the virtual world. The control device 150 may also perform control for moving the seat 180 up with respect to the base 110, for example, when the user P and the rideable mobile body 100A have reached a place with a good view in the virtual world. The control device 150 may also activate the blower 146, for example, when a scene where a strong wind blows (such as a coast, a mountainous area, or an encounter with a monster that blows breath) is set in the virtual world. Control signals for performing these operations are generated by the event action command generation unit 170 and transmitted to the seat actuator 182 and the blower 146.

The rideable mobile body 100A of the first embodiment may also include an operation receiving unit that receives an operation of raising or lowering the seat 180. In this case, the operation receiving unit may include a button or the like for receiving a raising or lowering instruction.

According to the first embodiment described above, it is possible to produce a sense of presence when providing a virtual experience to the user P.

Second Embodiment

Hereinafter, a second embodiment will be described. In the second embodiment, the rideable mobile body 100 may be provided with a moving mechanism (which is capable of at least moving forward, moving backward, and turning) other than the omnidirectional moving wheel 120 and thus it will be referred to as a moving mechanism 120B in the following description and drawing.

Figure 7:
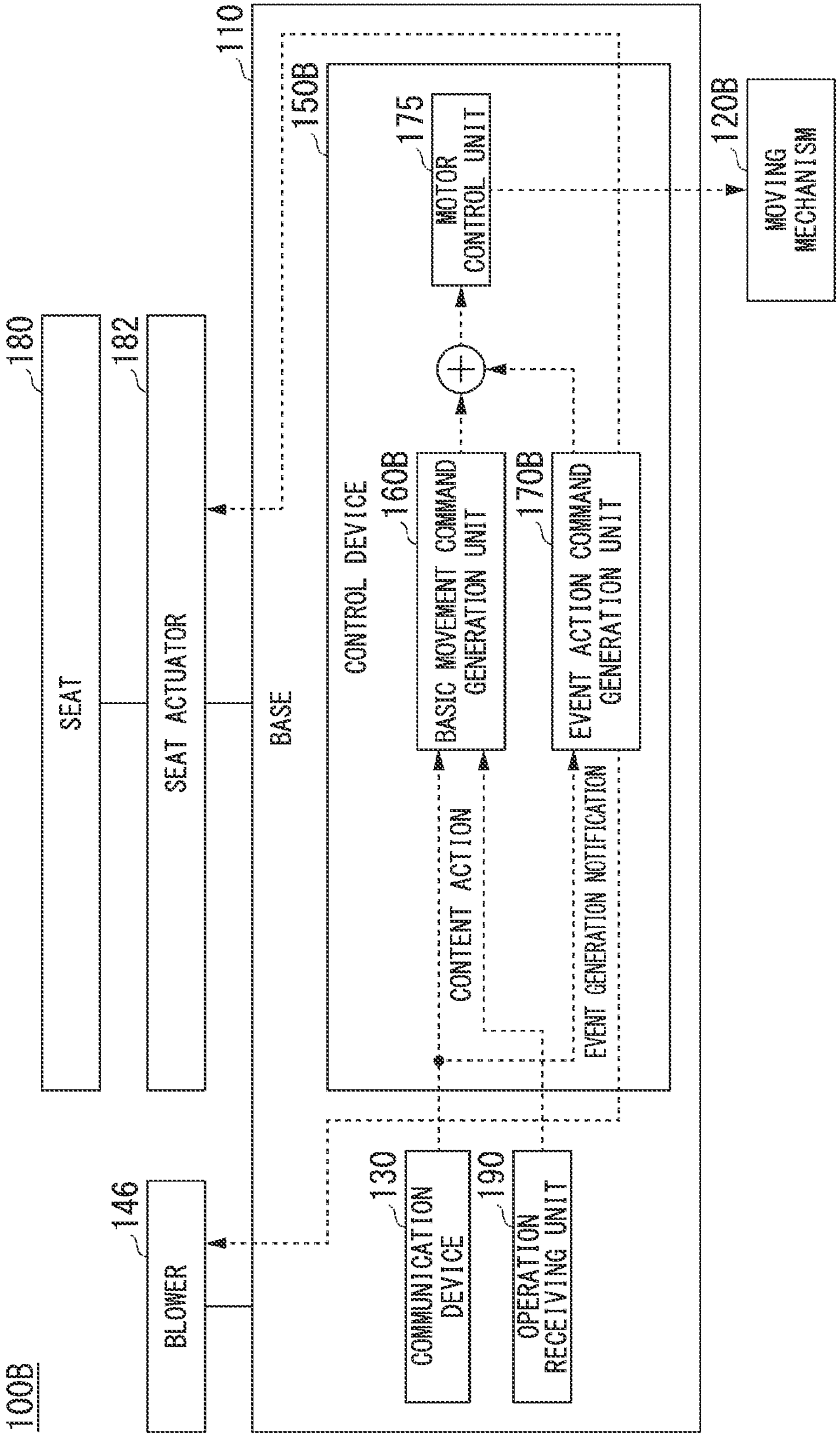
FIG. 7 is a configuration diagram of a rideable mobile body according to a second embodiment.

FIG. 7 is a configuration diagram of a rideable mobile body 100B of the second embodiment. The rideable mobile body 100B of the second embodiment includes an operation receiving unit 190 in place of (or in addition to) the sensor 140. The operation receiving unit 190 is, for example, a lever that can be operated back and forth and left and right and receives an instruction to accelerate when operated forth, an instruction to decelerate or move backward when operated back, and an instruction to turn when operated left or right. For example, the moving mechanism 120B of the second embodiment includes a drive wheel and a steering wheel and is configured such that a drive motor and a brake device are attached to the drive wheel and a steering mechanism is attached to the steering wheel. Specific modes of the operation receiving unit 190 and the moving mechanism 120B are not limited to these and any forms can be adopted. The operation receiving unit 190 may include that which receives an operation of raising and lowering a seat 180. In this case, the operation receiving unit 190 may include a button or the like for receiving a raising and lowering instruction. The blower 146 has any configuration and may be omitted.

The rideable mobile body 100B of the second embodiment is not limited to those that move somewhat freely on a plane and may be one that runs on rails laid in a virtual experience facility. In this case, the operation receiving unit 190 may be that which exclusively receives an instruction to accelerate and an instruction to decelerate or move backward.

A basic movement command generation unit 160B of the second embodiment physically integrates a content action command based on the content action received from the content control device 300 and a control command for acceleration, deceleration, or turning based on an operation received by the operation receiving unit 190 to generate a basic movement command.

An event action command generated by an event action command generation unit 170B of the second embodiment includes some or all of an instruction for a seat actuator 182, an instruction for a blower 146, and a correction command for the basic movement command. For example, when an event occurrence notification indicating "to swing back and forth" is given, the event action command generation unit 170B instructs the seat actuator 182 to swing (fluctuate) the forward and backward tilt of the seat 180. When an event occurrence notification indicating "to suppress a forward movement due to a steering operation" is given, the event action command generation unit 170B may instruct the seat actuator 182 to tilt the seat 180 backward to give the user P a feeling that it is difficult to move forward in a pseudo manner or may output an instruction to decelerate to a motor control unit 175 as a correction command for the basic movement command. When an event occurrence notification indicating "to restrict turning" is given, the event action command generation unit 170B may output an instruction to suppress turning as a correction command for the basic movement command to the motor control unit 175. When an event occurrence notification indicating "to move backward" is given, the event action command generation unit 170B may output a correction command for cancelling a moving forward command and instructing to move backward as a correction command for the basic movement command to the motor control unit 175. Regarding the "strong wind," the second embodiment is similar to the modification of the first embodiment (of FIG. 6). In the second embodiment, regarding "to swing back and forth" or "to swing from side to side," the event action command generation unit 170B may swing (fluctuate) the driving force and braking force of the moving mechanism 120B or swing (fluctuate) the steering angle from side to side to achieve swinging back and forth or from side to side.

In the second embodiment, when performing an operation based on a basic movement command and an operation based on an event action command in parallel, the control device 150B may generate an event action command for not performing an operation hindering the operation based on the basic movement command That is, when an instruction from the user P received by the operation receiving unit 190 is to accelerate, decelerate, or turn, the event action command may be limited to swinging, tilting, or the like of the seat 180 that does not interfere with the acceleration, deceleration, or turning.

According to the second embodiment described above, it is possible to produce a sense of presence when providing the virtual experience to the user P, similar to the first embodiment.

Although the mode for carrying out the present invention has been described above by way of embodiments, the present invention is not limited to these embodiments at all and various modifications and substitutions may be made without departing from the spirit of the present invention.

What is claimed is:

1. A virtual experience providing system that provides a virtual experience in a virtual reality image based on a virtual world representing a real world or an artificial world to a user who rides a rideable mobile body, the system comprising:

a storage medium configured to store computer-readable instructions; and a processor connected to the storage medium, the processor executing the computer-readable instructions to:

generate a basic movement command for controlling movement of the rideable mobile body based on a steering operation of the user; and detect an occurrence of a predetermined event in the virtual world and generate, upon the detection, an event action command dynamically generated based on the detected event, the event action command being different from the basic movement command, wherein the processor operates the rideable mobile body based on both the basic movement command and the event action command in parallel, and executes the event action command without hindering an operation based on the basic movement command, based on an environment in which the rideable mobile body is located in the virtual world, generates a correction command as the event action command to change a relationship between the user's steering operation and the basic movement command, and generates the event action command in such a way that the event action command does not cause any actions that contradict actions performed by the basic movement command.

2. The virtual experience providing system according to claim 1, wherein the steering operation is performed according to movement of a center of gravity of the user, and the processor generates the basic movement command based on the movement of the center of gravity detected using a sensor mounted on the rideable mobile body.

3. The virtual experience providing system according to claim 1, wherein the rideable mobile body has a function of moving the user up and down, and the processor generates a command for an operation of moving the user up and down as the event action command.

4. The virtual experience providing system according to claim 1, wherein the rideable mobile body has a function of moving the user up and down, and the processor generates a command for an operation of moving the user up and down as the basic movement command based on the steering operation of the user.

5. The virtual experience providing system according to claim 1, wherein the rideable mobile body includes a blower, and the processor generates a command for an operation of activating the blower in response to a change in an environment in the virtual world as the event action command when a specific predetermined event has occurred.

6. A computer-readable non-transitory storage medium storing a program that, when executed by at least one computer of a virtual experience providing system, the system providing a virtual experience in a virtual reality image based on a virtual world representing a real world or an artificial world to a user who rides a rideable mobile body, causes the at least one computer to:

generate a basic movement command for controlling the rideable mobile body based on a steering operation of the user; and detect occurrence of a predetermined event occurring in the virtual world and dynamically generate, upon the detection, an event action command based on the detected event, the event action command being different from the basic movement command, wherein the program causes the at least one computer of the virtual experience providing system to operate the rideable mobile body based on both the basic movement command and the event action command in parallel, and the program causes the at least one computer to execute the event action command without hindering an operation based on the basic movement command, the program causes the at least one computer to generate, based on an environment in which the rideable mobile body is located in the virtual world, a correction command as the event action command to change a relationship between the user's steering operation and the basic movement command, and to generate the event action command in such a way that the event action command does not cause any actions that contradict actions performed by the basic movement command.

* * * * *